United States Patent [19]

Freeman

[11] 3,961,171

[45] June 1, 1976

[54] METHOD OF OBTAINING CORRELATION BETWEEN CERTAIN SELECTED SAMPLES OF A SEQUENCE

[75] Inventor: Jacob J. Freeman, Silver Spring, Md.

[73] Assignee: The United States of America as represented by the Secretary of the Navy, Washington, D.C.

[22] Filed: Feb. 18, 1975

[21] Appl. No.: 550,796

[52] U.S. Cl. .............................. 235/181; 340/146.2
[51] Int. Cl.² .......................................... G06F 15/34
[58] Field of Search .............. 235/181, 150.53, 177; 340/146.2; 343/6.5

[56] References Cited
UNITED STATES PATENTS

| | | |
|---|---|---|
| 3,439,155 | 4/1969 | Alexander .......................... 235/181 |
| 3,466,614 | 9/1969 | Mikailoff et al. .............. 343/6.5 LC |
| 3,517,175 | 6/1970 | Williams .......................... 340/146.2 |
| 3,522,541 | 8/1970 | Gooding .............................. 235/181 |
| 3,622,987 | 11/1971 | Borkan ............................ 340/146.2 |
| 3,670,151 | 6/1972 | Lindsey et al. ..................... 235/181 |

*Primary Examiner*—Jerry Smith
*Attorney, Agent, or Firm*—R. S. Sciascia; Philip Schneider; Norman Brown

[57] ABSTRACT

Detection of a class of input-signal pulse-sequences is accomplished by comparison of the signal as sampled and digitally coded twice per pulse-width with a similarly sampled reference signal also digitally coded, but having an arbitrary complementary digital pair in pulse positions whose information content is of no concern.

8 Claims, 5 Drawing Figures

METHOD OF OBTAINING CORRELATION BETWEEN CERTAIN SELECTED SAMPLES OF A SEQUENCE

BACKGROUND OF THE INVENTION

The present invention relates to correlation techniques and more particularly to a method of obtaining correlation between an input-signal pulse-sequence and a reference-signal pulse-sequence by resort to comparison-correlation of sampled and digitally coded pulse sequence representations, thereby providing detection of a particular class of input pulse sequences.

In general, prior types of programmable correlation apparatus give equal attention to all pulse positions or utilize costly techniques to ignore pulse-positions whose information content is considered irrelevant. In many instances it is desirable to direct the correlation process to only pulse positions of concern, ignoring irrelevant pulse positions.

SUMMARY OF THE INVENTION

The present invention detects, by a correlation technique, a specific pulse sequence through a method of digitally coding the reference and input signals. The invention is implemented to realize an electronically programmable pulse-position-sensitive correlation-detection technique.

In order to determine the occurrence of a particular class of pulse-sequences corresponding to that of significant pulse positions of the reference pulse-sequence, the present invention specially compares a digitally coded input-signal pulse-sequence with a digitally coded reference-signal pulse-sequence.

An input-signal pulse-sequence is sampled once during each half of each pulse-width interval, and the sampled signal values are coded as a binary 1 or 0 appropriately to provide a half-bit of binary information. A reference pulse-sequence (containing the input sequence pattern to be detected) is generated, providing a pulse or non-pulse (absence of a pulse) twice during each pulse-width interval, except for each non-significant pulse position—a position whose information content is of no concern—which is coded with a pair of complementary digital values. This provides the desired pulse reference pattern with its half-bits of binary information.

Comparison is then made between corresponding samples of respective input and reference signals, each correspondence resulting in a digital 1, and each non-correspondence a digital 0. The comparison results are then all added, and the sum is then indicative of the correlation between the input and reference pulse-sequences.

When an input signal having the same pulse separation or spacing as the reference occurs, the correlation value rises significantly, thereby indicating coincidence of the input and reference signals.

The average value, or bias, contributed by the comparison of the non-significant pulse positions may be removed by subtracting from the correlation sum that value resulting from the contribution of each non-significant position comparison.

It is therefore an object of the present invention to quickly, reliably and inexpensively detect, decode, or separate one particular sequence of binary-pulse waveforms from all other wave-forms;

It is another object of the present invention to detect the occurrence of a particular signal pulse-sequence associated with particular pulse-positions, while ignoring information contained in non-significant pulse-positions;

Other objects, advantages and novel features of the invention will become apparent from the following detailed description of the invention when considered in conjunction with the accompanying drawings wherein:

DESCRIPTION OF THE DRAWINGS

FIG. 4 depicts typical content of shift registers of both embodiments of the present invention, and the results of comparison of corresponding stages.

DETAILED DESCRIPTION

Figure 1:
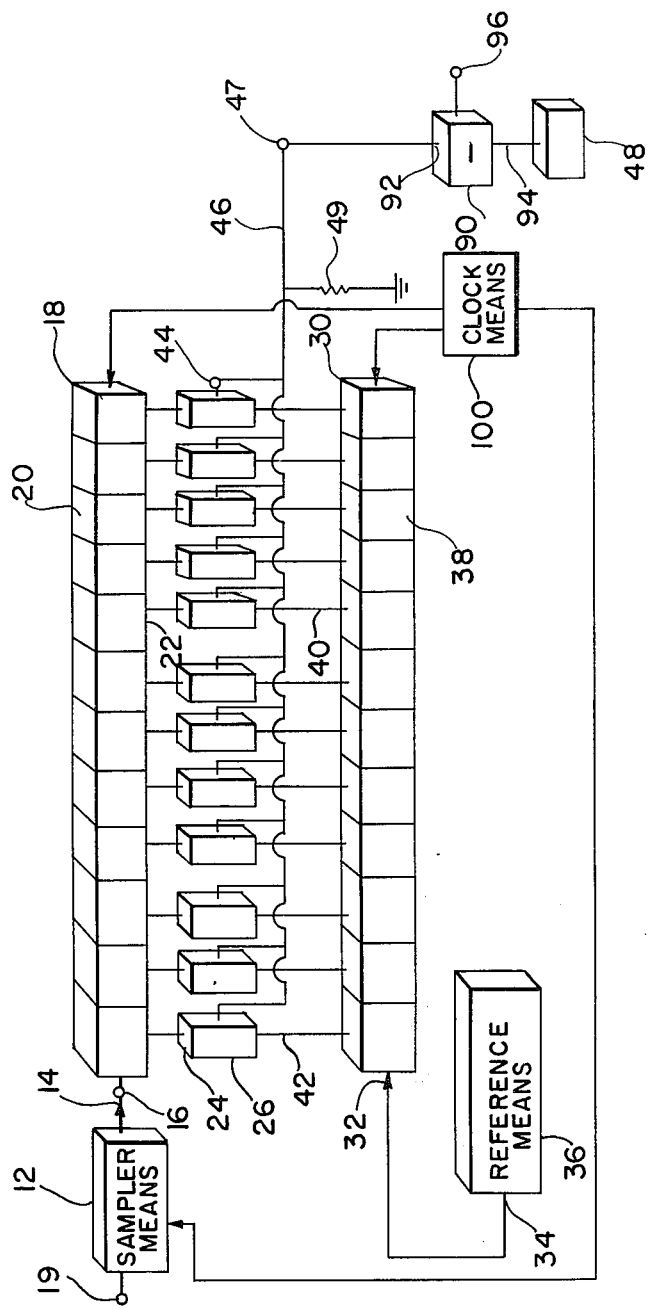
FIG. 1 is a functional-schematic diagram of a first embodiment of the present invention.

In a first embodiment of the present invention, depicted in FIG. 1, a signal input terminal 19 is connected to the input terminal of a digital sampler 12 having an output terminal 14. An input terminal 16 of a shift register 18 is connected to sampler output terminal 14. Shift register 18 is comprised of n individual shift-register stages 20, each having a tap lead 22. Each tap lead 22 is connected to a corresponding first input terminal 24 of a corresponding one of a set of n comparator elements 26.

A second shift register 30 has an input terminal 32 connected to the output terminal 34 of a reference signal generator 36. Shift-register 30 is also comprised of n individual shift-register stages 38, each of which has a tap lead 40. Each tap lead 40 is connected to a corresponding second input terminal 42 of a corresponding one of the set of comparator elements 26. Each comparator element 26 has an output terminal 44 connected to a common output line 46. A resistor 49 is connected between the common output line 46 and the circuit ground. A subtractor device 90 has a first input terminal 92 connected to a corrrelation output terminal to which a common output line 46 feeds, and a second input terminal 94 connected to a constant voltage generator device 48. The output terminal of subtractor 90 is connected to a correlation-detector output terminal 96.

Figure 2:
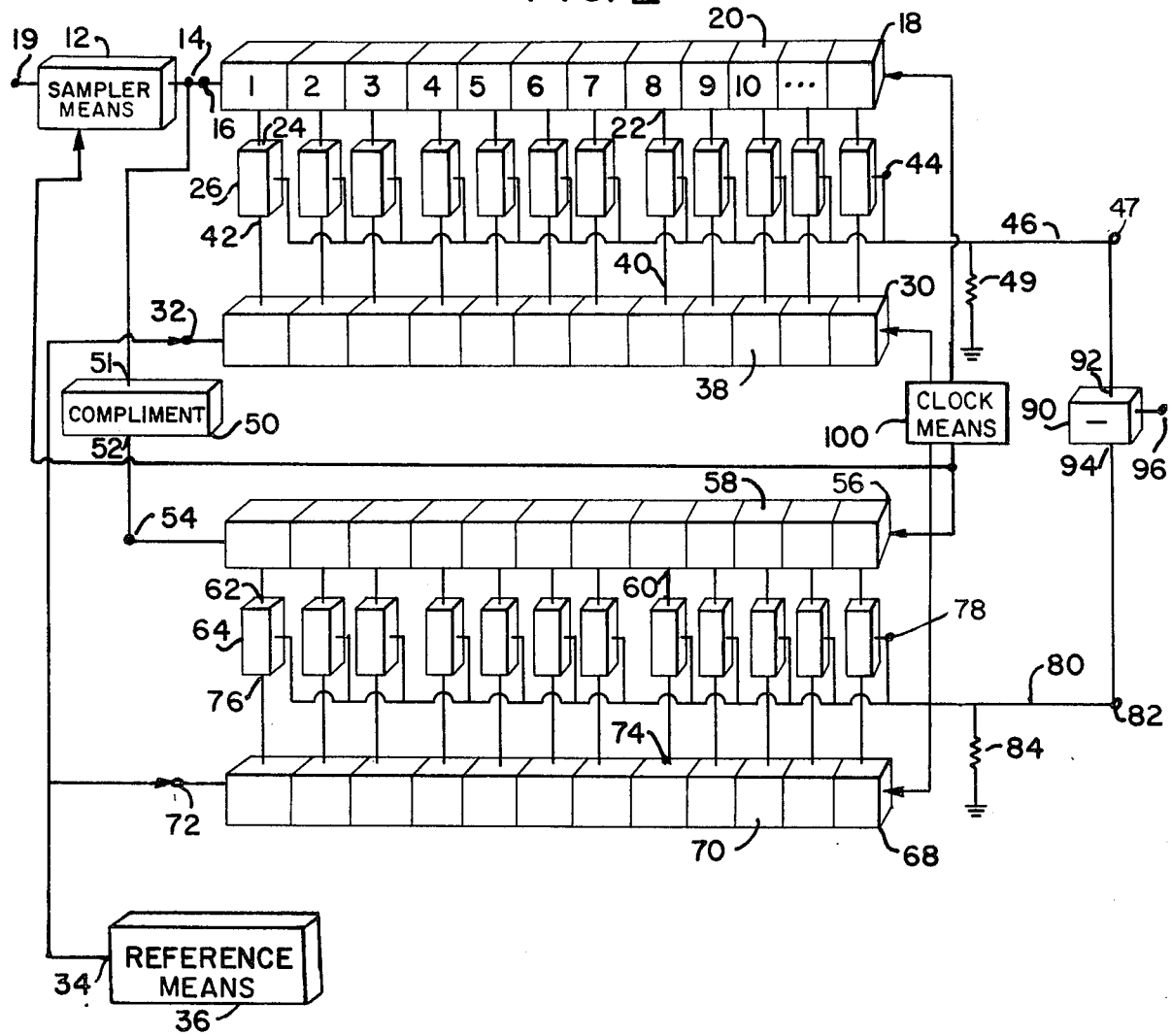
FIG. 2 is a functional-schematic diagram of a second embodiment of the present invention.

In a second embodiment of the present invention, depicted in FIG. 2, additional elements are added to those of the above described first embodiment of the present invention (with the elements of the first embodiment numbered the same in the second embodiment). The additional elements include a complementing device 50 having an input terminal connected to sampler output terminal 14. Complementer 50 has an input terminal 51 connected to sampler output terminal 14 and an output terminal 52 connected to an input terminal 54 of a third shift register 56, having n register stages 58. Each register stage 58 has a tap lead 60 connected to a corresponding first input terminal 62 of a corresponding one of a set of n comparator elements 64.

A fourth shift register 68, also having n register stages 70, has its input terminal 72 connected to reference signal generator output terminal 34. Each register stage 70 has a tap 74 connected to a corresponding second input terminal 76 of a corresponding one of the set of comparator elements 64. Each comparator element 64 has an output terminal 78 connected to a second common output line 80 which is in turn connected to a second correlation output terminal 82. A resistor 84 is connected between second common output line 80 and the circuit ground.

A subtractor device 90 has a first input terminal 92 connected to first common output line 46, and a second input terminal 94 connected to second output terminal 82. The output of subtractor 92 is connected to a net correlation output terminal 96.

Figure 3A:
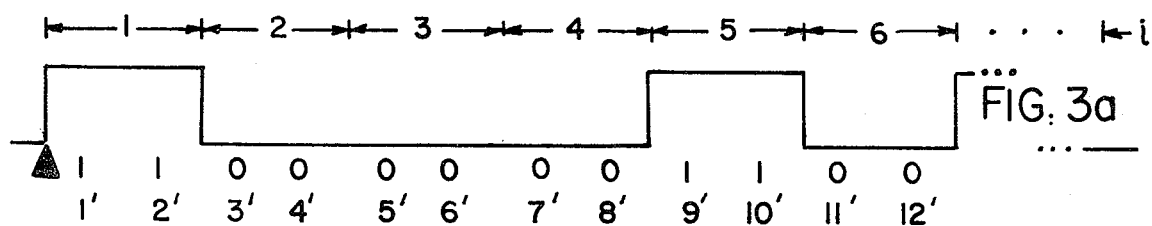
FIG. 3a is a pictorial diagram of a typical pulse signal waveform and its corresponding digital coding in accordance with the technique of the present invention.

To aid in the understanding of operation of the present invention, reference is made to FIG. 3a, which depicts a typical input-signal pulse sequence. This input-signal consists of a series or sequence of pulses spaced in time and occupying pulse positions 1, 2, 3, 4, 5 . . . i . . . (from left to right) as they occur (are received at sampler 12). The input-signal may contain a pulse-sequence that is desired to be detected. The illustrated input-sequence of FIG. 3a does contain a partial desired pulse-sequence (i.e., a pulse in position 1, and a pulse-absence in position 2).

Referring to FIG. 1, the input-signal is sampled and digitally coded (in the well-known manner) appropriately with a 1 or 0 by sampler 12 during each half of each pulse-width interval. The resulting digital series representing the coded signal pulse-sequence is denoted by the numbered sequence 1', 2', 3' . . . n' of FIG. 3a.

These binary coded samples characterizing the input-signal pulse-sequence are serially loaded into first shift-register storage device 18, and caused to proceed sequentially through each stage of the device (in any well-known manner) by clock means 100.

Figure 3B:
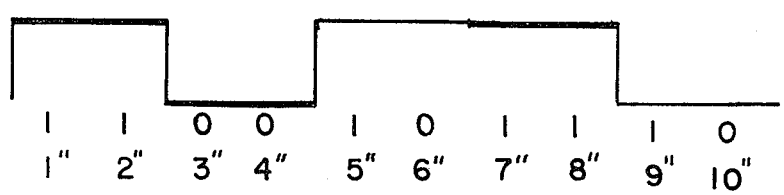
FIG. 3b is a pictorial diagram of a typical reference signal waveform and its corresponding digital coding in accordance with the technique of the present invention.

A reference pulse-sequence, depicted in FIG. 3b, consists of a series of pulse positions (which are the same as the pulse positions of FIG. 3a labeled 1, 2, 3, 4 . . . i . . . from left to right), or intervals, in which a pulse (deemed a relevant pulse) exists, or in which a pulse does not exist (deemed a relevant pulse absence), together with the spacing between these relevant pulses or pulse absences.

The reference pulse-sequence represents a particular pulse-sequence of an input signal that is desired to be detected. An example chosen for illustrative purposes is the desired detection of a sequence in which a pulse occurs in position 1, followed by the non-occurrence of a pulse in position 2, which is followed by another pulse in the interval 4. The occurrence or non-occurrence of a pulse in the pulse interval 3, or after interval 4, is irrelevant. Only the occurrence of the designated pulses and their spacing is relevant or significant.

The reference pulse sequence is specially coded in accordance with the technique of the present invention, in which each relevant pulse is coded with a pair of digital 1's, each relevant pulse-absence is coded with a pair of digital 0's, and each reference pulse-position whose signal value is of no concern (i.e., not having a relevant pulse or relevant pulse-absence) is coded with a complimentary binary pair (i.e., a digital 1 and 0). The resulting digital series representing the coded reference pulse-sequence (denoted by the numbered sequence 1'', 2'', 3'' . . . ) is indicated in FIG. 3b. This sequence is loaded into second shift-register storage device 30 so that a particularly numbered digital value is stored in a correspondingly numbered register stage 38, and caused to proceed sequentially through each stage of the device by clock means 100.

The series of digital values representing the reference pulse sequence may derive from the binary state of physical devices, such as the state of switches (electronic or mechanical), computer digital lines, or their equivalent.

During each clock cycle, element comparators 26 compare the digital values of corresponding shift register stages connected to respective comparator elements 26. Comparator elements 26 produce a high-level output signal at output terminals 44, if both associated corresponding shift-register stages (e.g., 20, 38) are of the same digital value, and produce no output signal if the corresponding stages are of opposite digital value. Since the output of each one of the set of comparator elements 26 is connected to common output line 46 and thereby through resistor 49 to ground, each high-level output signal will produce a corresponding current through resistor 49. In this manner the voltage across resistor 49 is indicative of the number of shift register stages having corresponding digital values.

The content of first shift-register 18 (containing a coded input signal) and second shift-register 30 (containing the coded reference signal) is depicted in FIG. 4. The result of comparisons of corresponding stages is also depicted; a + symbol is used for corresponding stages having the same digital value, and a —" symbol for corresponding stages not having the same digital value. (This figure will be further described in reference to operation of the second embodiment).

In the course of this comparison, or correlation process, a non-significant pulse position will always result in one and only one of the two digital values associated with a given pulse position yielding a correlation (because of the fact that both digital values of each digital pair representing an input-signal pulse position will be coded the same, but the corresponding pair of a non-significant reference pulse-position will have a 1 and a 0).

In general, the summed correlation output voltage (across resistor 49) is proportional to $K = 2r + i$, where $r$ is the number of significant reference pulse positions and $i$ the number of non-significant reference pulse positions. For any particular reference sequence, $K$ uniquely defines the occurrence of that sequence and the resulting summed correlation voltage may be used to trigger a properly biased threshold, thereby providing indication of occurrence of the reference sequence existing in the input signal pulse sequence.

Accordingly, irrelevant pulse positions contribute a constant bias to the correlation, which constant bias may easily be eliminated by a bias of opposite sense. This bias is eliminated in the first embodiment of the present invention by subtracting (in subtractor 90) from the summed correlation output voltage the voltage from voltage generator 48, which is set to equal to the bias voltage. The subtractor output terminal 96 then forms the output terminal of the entire detection-correlation device of the first embodiment of the present invention.

Turning now to FIG. 2, the bias voltage may also be eliminated in a more automatic fashion (while at the same time decreasing the overall detection output-signal when other than the desired reference-sequence exists in the input signal-sequence). It can be seen that the voltage generator 48 is not utilized in this second embodiment, but the second output terminal 82 is connected to subtractor 90 in its place.

The binary coded reference-sequence is also fed to fourth shift register 68 (in a manner similar to that for the first register 30, as described above). The sampled and coded signal-sequence (e.g., depicted in FIG. 3a) converted to its complement (i.e., changing each 1 to a 0 and vice versa). The converted sequence is then fed to third shift register 56. The second set of comparators 64 compares corresponding stages of third and fourth shift registers 56, 68, in a manner similar to that already described for first and second registers 18, 38. In this manner a counter-bias voltage is produced across resistor 84 (i.e., summing individual comparator element output signals as previously described for resistor 49). This counter-bias voltage is subtracted from the voltage present on common correlation-output line 46, and the result at subtractor output terminal 96 forms the total correlation-detection output signal of the entire device.

FIG. 4 depicts the content of third shift-register 56 (containing the complementary coded input-signal), and fourth shift-register 68 (containing the coded reference signal). The result of comparisons of corresponding stages is also depicted—a + symbol for corresponding stages having the same digital value, and a "·" symbol for corresponding stages not having the same digital value.

In general, an input-signal pulse-sequence contains, in significant pulse positions, a number $r_a$ of desired information-values (i.e., those agreeing with corresponding reference-sequence values), a number $r_d$ of non-desired information-values (i.e., those not agreeing with corresponding reference-sequence values), and a number $i$ of information values in non-significant pulse-positions. Since each information-value is represented by a pair of binary values, as previously described, then it follows that the correlation value $C_{ri}$ between reference and input coded signals equals $(2r_a + i)$. The correlation value $C_{\bar{ri}}$ between the complement of the input and the reference equals $(2r_d + i)$. The difference $(C_{ri} - C_{\bar{ri}})$ equals $2(r_a - r_d)$, thereby eliminating the effect of the bias. When the input signal corresponds to the stored reference, $r_a = r$, $r_d = 0$, the difference between the correlation equals $2r$.

From FIG. 4 and the foregoing description, it is seen that by subtracting the counter-bias voltage from the correlation-output voltage (on line 46), not only is the bias voltage contribution automatically removed, but for any given input signal-sequence differing from the reference-sequence, the difference-signal forming the device output-signal in the second embodiment of the present invention is of lower voltage then would be the voltage at the correlation-detector output terminal 96 of the first embodiment, although the output voltages are the same for an input signal containing the reference-sequence to be detected.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for detecting, from among an input-sequence of information-values, a class of input information-value sequences comprising the steps of:
   first, creating a reference information-sequence comprising a series of reference-values, each said reference value being contained in either a significant sequence-position or a non-significant sequence-position, and having a desired information content in each of said significant sequence-positions, and an arbitrary information content in each of said non-significant sequence-positions;
   second, coding said reference information-sequence with a pair of identical binary ones for each sequence-position if said desired information content is greater than a predetermined threshold, a pair of binary zeroes for each sequence position if said desired information content is less than a predetermined threshold, and coding said arbitrary information content with a pair of complementary binary values for each sequence position, thereby forming a coded reference-sequence corresponding to said reference information sequence;
   third, coding each said input information-value with a pair of binary ones for each sequence position if said information-value is greater than a predetermined threshold, a pair of binary zeroes for each sequence position if said information-value is less than a predetermined threshold, thereby forming a coded input-sequence corresponding to said input information-value sequence;
   fourth, comparing binary values of said coded input-sequence with correspondingly spaced binary values of said coded reference-sequence;
   fifth, summing the number of said comparisons in which said compared binary values are of the same value,
   whereby said summed number is indicative of the occurrence, in said input-signal sequence, of said desired class of sequences; and
   sixth, supplying a cancelling signal equal in value to the bias value resulting from the comparisons of coded signals in non-significant sequence positions and subtracting the cancelling from the summed signal.

2. The method of claim 1 wherein said input-sequence is a time-ordered pulse-sequence signal, and wherein each said information-value is represented by a signal pulse.

3. Apparatus for detecting a particular class of pulse sequences in an input-signal pulse-sequence, each sequence of said particular class containing pulse information-values and spacing identical to that of a reference pulse-sequence, said reference pulse-sequence being formed by a series of reference values, each said reference value being contained in either a significant pulse-sequence position or a non-significant pulse-sequence position, said reference pulse-sequence having a desired information-content in each said significant pulse-sequence position, and an arbitrary information-content in each said non-significant pulse-sequence position; said apparatus comprising:
   means for sampling said input-signal and for binary coding said sampled signal;
   means, connected to said sampling and coding means, having stages for storing each said coded signal-value in a corresponding one of said signal storage means stages;

means for generating said reference pulse-sequence wherein a pair of binary ones is provided if said information-content is greater than a predetermined threshold, a pair of binary zeroes is provided if said information-content is less than a predetermined threshold, and each said arbitrary information content is provided with a complementary binary pair;

means, connected to said reference, having stages for storing each said coded reference value in a corresponding one of said reference storage means stages;

means connected between corresponding ones of said signal storage means stages and said reference storage means stages for comparing corresponding stages of said signal and reference storage means and for producing an elemental output signal upon correspondence between corresponding ones of said binary values stored in said signal and reference storage means;

means connected to said comparing means for combining said elemental output signals; and means connected to the output of said combining means for eliminating bias signals arising from comparison of information values contained in non-significant pulse-positions;

whereby the value of said combined signals is indicative of the occurrence of one of said desired class of pulse-sequences to be detected.

4. The signal pulse-sequence detection device of claim 3 wherein said bias elimination means comprises:

means for generating a signal equal to said bias signal; and subtracting means, having a first input terminal connected to the output of said bias signal generating means, a second input terminal connected to the output of said combining means, and an output terminal.

5. The signal pulse-sequence detection device of claim 3 wherein said bias elimination means comprises;

means, connected to the output of said signal sampling and coding means, for generating complementary values of each binary value of said coded input-signal;

means connected to the output of said complementing means having stages for storing each said complemented signal value in a corresponding one of said first storage means stages;

means, connected to the output of said reference signal coding means, having stages for storing each said coded reference value in a corresponding one of said first storage means stages;

means connected between corresponding stages of the above recited storage means for comparing corresponding stages of said storage means and for producing a complementary-elemental output signal upon correspondence between corresponding ones of said binary values stored in said first and second signal storage means;

means, connected to said above recited comparison means, for combining said complementary-elemental output signals; and subtracting means, to which the elemental and complementary-elemental signals are fed, for subtracting one of these input signals from the other.

6. Apparatus for detecting the presence of a particular pattern of pulses and non-pulses (absence of pulses) in a given set of pulse positions, the pattern having significant and non-significant pulse positions, said apparatus comprising:

sampling means, to which an input signal is fed, for sampling the input signal twice during each period corresponding in time to one pulse position and for binary-coding each half-bit of information obtained from the samplings;

reference means for generating a reference pattern of binary-valued pulses, two half-bits for each pulse position, the non-significant pulse positions always having a pair of different-valued pulses and the significant pulse positions always having pair of same-valued pulses;

means for receiving the output of said sampling means and for storing said output, each half-bit of information being stored in its own storage stage;

means for receiving the output of said reference means and for storing said output, each half-bit of information being stored in its own storage stage;

means for comparing each half-bit of the stored sampling-means output signal with its correspondingly positioned half-bit of the stored reference signal and providing a binary 1 output when two compared half-bits are equal in value and a binary 0 when they are not;

means for summing the comparison-means binary outputs to obtain a correlation output signal; and means for eliminating from the correlation output signal a bias component equal in value to the value of the correlation signal contributed by the non-significant pulse-position half-bits, so that the output of said eliminating means is a signal whose value varies directly as the number of pulse positions in which the input signal corresponds with the reference signal.

7. Apparatus as in claim 6, wherein the bias eliminating means comprises:

means for generating a cancelling signal equal in value to said bias component; and means for subtracting said cancelling signal from said correlation output signal.

8. Apparatus as in claim 6, wherein said bias eliminating means comprises:

means to which the output of said sampling means is fed for generating a binary signal complementary to its input signal;

means, similar to the means for producing said correlation output signal, for receiving said complementary signal, comparing it to said reference signal, and producing a second correlation output signal therefrom; and means for subtracting said correlation output signal and said second correlation output signal from each other.

* * * * *